(12) United States Patent
Watanabe et al.

(10) Patent No.: US 9,889,427 B2
(45) Date of Patent: Feb. 13, 2018

(54) TEMPERATURE-RESPONSIVE HYGROSCOPIC MATERIAL AND METHOD FOR PRODUCING THE SAME

(71) Applicant: TOYOTA JIDOSHA KABUSHIKI KAISHA, Toyota-shi, Aichi-ken (JP)

(72) Inventors: Masaki Watanabe, Sunto-gun (JP); Mamoru Ishikiriyama, Fujieda (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 4 days.

(21) Appl. No.: 14/943,572

(22) Filed: Nov. 17, 2015

(65) Prior Publication Data

US 2016/0144342 A1    May 26, 2016

(30) Foreign Application Priority Data

Nov. 21, 2014    (JP) ................................. 2014-236802

(51) Int. Cl.
*C07F 7/10* (2006.01)
*B01J 20/28* (2006.01)
*B01J 20/32* (2006.01)

(52) U.S. Cl.
CPC ... *B01J 20/28097* (2013.01); *B01J 20/28011* (2013.01); *B01J 20/28083* (2013.01); *B01J 20/3204* (2013.01); *B01J 20/3217* (2013.01); *B01J 20/3219* (2013.01); *B01J 20/3248* (2013.01); *B01J 20/3272* (2013.01); *B01J 20/3291* (2013.01)

(58) Field of Classification Search
CPC ....................... B01J 20/28097; B01J 20/28083
USPC ........................................................ 556/419
See application file for complete search history.

(56) References Cited

U.S. PATENT DOCUMENTS

| | | |
|---|---|---|
| 2005/0013988 A1 | 1/2005 | Fu et al. |
| 2007/0023289 A1* | 2/2007 | Miyata ............... B01J 20/28033 204/515 |
| 2010/0058782 A1 | 3/2010 | Brovchenko et al. |
| 2013/0029242 A1 | 1/2013 | Mizuhata et al. |
| 2014/0124445 A1 | 5/2014 | Nagase et al. |

FOREIGN PATENT DOCUMENTS

| | | |
|---|---|---|
| EP | 0534016 A1 | 3/1993 |
| JP | 2000-262892 A | 9/2000 |
| JP | 2012-35179 A | 2/2012 |
| JP | 2013-131290 A | 7/2013 |

OTHER PUBLICATIONS

Ichihashi et al, Kagaku Kogaku Ronbunshu (2008), 34(4), 471-476; JP ver and STN abstract.*
MEH-PPV—Mol Wt from SIGMA-ALDRICH for Miyata.*
Vallet-Regi et al., Chem. Mater. 2001, 13, 308-311.*
Ichihashi et al, Kagaku Kogaku Ronbunshu (2008), 34(4), 471-476.*
Moller et al., Chem. Mater. 1998, 10, 2950-2963.*
Alem et al. "Microstructure and thermo-responsive behavior of poly (N-isopropylacrylamide) brushes grafted in nanopores of track-etched membranes," Journal of Membrane Science 308 (2008) pp. 75-86.
Reichhardt et al. "Porosity and Surface Properties of SBA-15 with Grafted PNIPAAM: A Water Sorption Calorimetry Study," Langmuir 2011, 27, pp. 13838-13846.
Toshio Ichihashi et al., "Characteristics of Water Vapor Adsorption and Desorption in Thermo-Sensitive Mesoporous Silica Gel/Polymer Gel", Kagaku Kogaku Ronbunshu, Aug. 1, 2008, pp. 471-476, vol. 34.

* cited by examiner

*Primary Examiner* — Sudhakar Katakam
*Assistant Examiner* — Kofi Adzamli
(74) *Attorney, Agent, or Firm* — Sughrue Mion, PLLC

(57) ABSTRACT

Provided is a temperature-responsive hygroscopic material having a hygroscopic property that varies widely according to temperature variation and a method for producing the temperature-responsive hygroscopic material. The temperature-responsive hygroscopic material includes a mesoporous body having an average pore diameter of 2 nm to less than 50 nm and a temperature sensitive molecule chemically bonded with the mesoporous body inside a pore of the mesoporous body. The method includes a step of causing, in a solvent including an activator and a coupling agent, a coupling reaction of: a mesoporous body having an average diameter of 2 nm to less than 50 nm and having a functional group on a surface thereof; and a temperature sensitive molecule having a functional group which can undergo a coupling reaction with the functional group on the surface of the mesoporous body.

14 Claims, 12 Drawing Sheets

STRUCTURE OF TEMPERATURE SENSITIVE MOLECULE $^{42}$CNO was uniformly detected from entire cross section of the particle $^{42}$CNO ION 10 μm

SUM OF ALL ION SPECIES

# TEMPERATURE-RESPONSIVE HYGROSCOPIC MATERIAL AND METHOD FOR PRODUCING THE SAME

TECHNICAL FIELD

The present disclosure relates to a temperature-responsive hygroscopic material and a method for producing the same.

BACKGROUND

A temperature-responsive hygroscopic material, which absorbs and releases moisture in the air according to temperature variation, is conventionally used in desiccant type dehumidifiers and air conditioners. Even if the temperature-responsive hygroscopic material degrades its hygroscopicity by absorbing moisture, it can recover the hygroscopicity by releasing moisture under predetermined conditions. Therefore, the temperature-responsive hygroscopic material is repeatedly used as a recyclable hygroscopic material.

As an example of such a temperature-responsive hygroscopic material, Non-Patent Literature 1 discloses a composite silica gel in which a temperature sensitive polymer and mesoporous silica gel are composited. It is disclosed that the moisture adsorption amount of the composite silica gel decreases at a temperature higher than the phase transition temperature of the temperature sensitive polymer. The composite silica gel is produced by: immersing mesoporous silica in a mixture solution of monomers of the temperature sensitive polymer and a polymerization initiator; thereafter causing thermal polymerization.

Patent Literature 1 discloses: a membrane electrode assembly including a temperature-responsive layer in which a temperature-responsive material is chemically bonded with a porous layer in pores of the porous layer; and living radical polymerization as a method for producing the temperature-responsive layer. It is described that the temperature-responsive material is difficult to be infiltrated or retained in pores of the porous layer when the average pore diameter of the porous layer is less than 50 nm, since the pores are too small. Patent Literature 2 discloses a temperature sensitive adsorption material including porous silica whose outer surface (surface other than the inner surfaces of pores) is uniformly covered with a small amount of a temperature sensitive polymer, wherein the inlet diameters of pores of the porous silica can be controlled by temperature control.

CITATION LIST

Non-Patent Literature

Non-Patent Literature 1: ICHIHASHI Toshio and NAKANO Yoshio, Characteristics of Water Vapor Adsorption and Desorption in Thermo-Sensitive Mesoporous Silica Gel/Polymer Gel, KAGAKU KOGAKU RONBUNSHU, Vol. 34, pp. 471-476, 2008

Patent Literatures

Patent Literature 1: JP 2013-131290 A
Patent Literature 2: JP 2012-035179 A

SUMMARY

Technical Problem

According to the composite silica gel disclosed in Non-Patent Literature 1, the adsorption amount of water vapor increases at a temperature lower than Lower Critical Solution temperature (LCST) of the temperature sensitive polymer in water, and decreases at a temperature higher than the LCST. Therefore, it is possible to lower the temperature at which the composite silica gel regenerates and to reduce energy required for the regeneration. However, there is a problem that the composite silica gel disclosed in Non-Patent Literature 1 has a small variation in hygroscopic property according to temperature variation.

Accordingly, an object of the present disclosure is to provide a temperature-responsive hygroscopic material having a large variation in hygroscopic property according to temperature variation, and a method for producing the temperature-responsive hygroscopic material.

Solution to Problem

As a result of intensive studies, the inventors of the present disclosure found the following: by preliminarily polymerizing monomers of a temperature sensitive molecule to produce the temperature sensitive molecule, and chemically bonding a functional group of the temperature sensitive molecule and a functional group on the surface of a mesoporous body having a predetermined average pore diameter, it is possible to uniformly retain more temperature sensitive molecules in pores of the mesoporous body than before and to have a larger variation in hygroscopic property according to temperature variation than that of conventional materials.

The present disclosure has been made based on the above finding.

In order to solve the above problem, the present disclosure is directed to the following embodiments. That is, a first embodiment of the present disclosure is a temperature-responsive hygroscopic material including a mesoporous body having an average pore diameter of 2 nm to less than 50 nm and a temperature sensitive molecule chemically bonded with the mesoporous body inside a pore of the mesoporous body.

In the first embodiment of the present disclosure, the "temperature sensitive molecule" represents a molecule which has a LCST in water and shows hydrophilicity at a temperature lower than the LCST and hydrophobicity at a temperature higher than the LCST.

In the first embodiment of the present disclosure and the second embodiment discussed below, it is preferable that the temperature sensitive molecule has a number average molecular weight of 2000 to 5000.

In the first embodiment of the present disclosure, it is preferable that an introduced amount of the temperature sensitive molecule is 5.2 mass % to 21.4 mass % based on the total mass of the temperature-responsive hygroscopic material.

The second embodiment of the present disclosure is a method for producing a temperature-responsive hygroscopic material, the method including a step of causing, in a solvent including an activator and a coupling agent, a coupling reaction of: a mesoporous body having an average pore diameter of 2 nm to less than 50 nm and having a functional group on a surface thereof; and a temperature sensitive molecule having a functional group which can undergo a coupling reaction with the functional group on the surface of the mesoporous body.

In the second embodiment of the present disclosure, it is preferable that the functional group of the temperature sensitive molecule, which can undergo a coupling reaction with the functional group on the surface of the mesoporous body, is a functional group that the temperature sensitive molecule does not originally have and that is preliminarily added to the temperature sensitive molecule. In addition, it is preferable that the functional group, which can undergo a coupling reaction with the functional group on the surface of the mesoporous body, is positioned at an end portion of the temperature sensitive molecule.

According to an embodiment of the present disclosure, it is possible to provide: a temperature-responsive hygroscopic material in which temperature sensitive molecules are uniformly retained in pores of the mesoporous body; a temperature-responsive hygroscopic material having a large variation in hygroscopic property according to temperature variation; and a method for producing the temperature-responsive hygroscopic material.

DESCRIPTION OF EMBODIMENTS

Hereinafter the various embodiments and aspects of the present disclosure will be described. The embodiments shown below are examples of the present disclosure, and the present disclosure is not limited to the embodiments shown below.

1. Temperature-Responsive Hygroscopic Material

The first embodiment of the present disclosure is a temperature-responsive hygroscopic material including a mesoporous body having an average pore diameter of from 2 nm to less than 50 nm and a temperature sensitive molecule chemically bonded with the mesoporous body inside a pore of the mesoporous body.

Figure 1A:
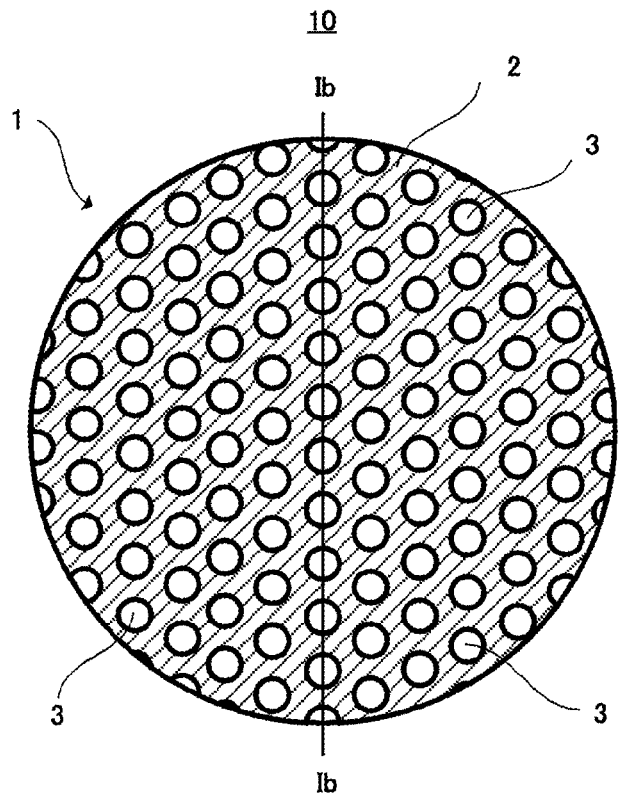
FIG. 1A is a schematic view of a primary particle (temperature-responsive hygroscopic material particle 10) of a temperature-responsive hygroscopic material according to one embodiment of the present disclosure.
Figure 1B:
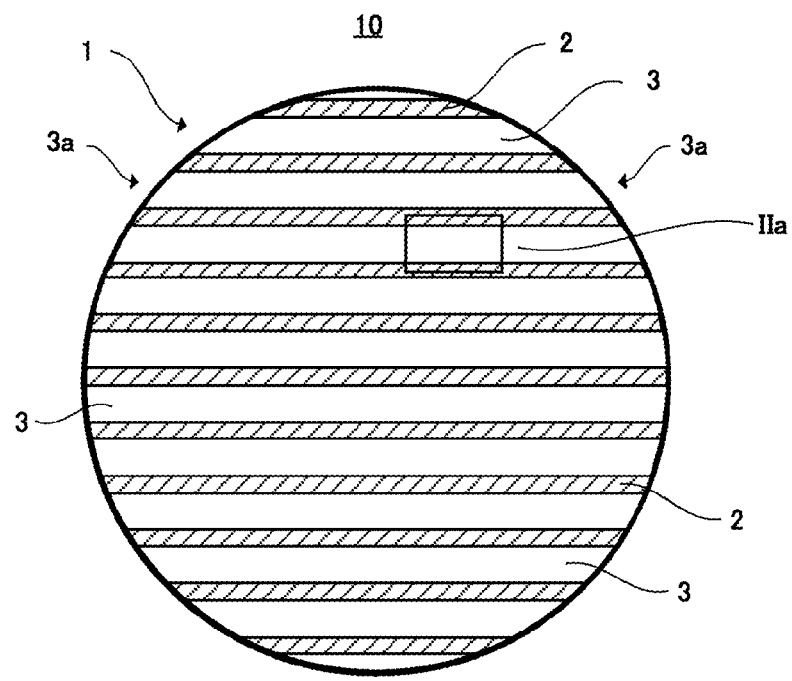
FIG. 1B is a cross-sectional view taken along the line Ib-Ib in FIG. 1A.

FIG. 1 (FIGS. 1A and 1B) is a schematic view of a primary particle (temperature-responsive hygroscopic material particle 10) of the temperature-responsive hygroscopic material according to one embodiment of the present disclosure. The temperature-responsive hygroscopic material particle 10 includes a temperature sensitive molecule 4 (not shown in FIG. 1) chemically bonded with a mesoporous body inside a pore 3 of a primary particle (mesoporous particle 1) of the mesoporous body. FIG. 1A is a schematic view of the temperature-responsive hygroscopic material particle 10 seen from an opening direction of the pore 3 of the mesoporous particle 1, and FIG. 1B is a cross-sectional view taken along the line Ib-Ib in FIG. 1A. As shown in FIGS. 1A and 1B, the mesoporous particle 1 includes a particle skeleton 2 and a plurality of pores 3.

Figure 2A:
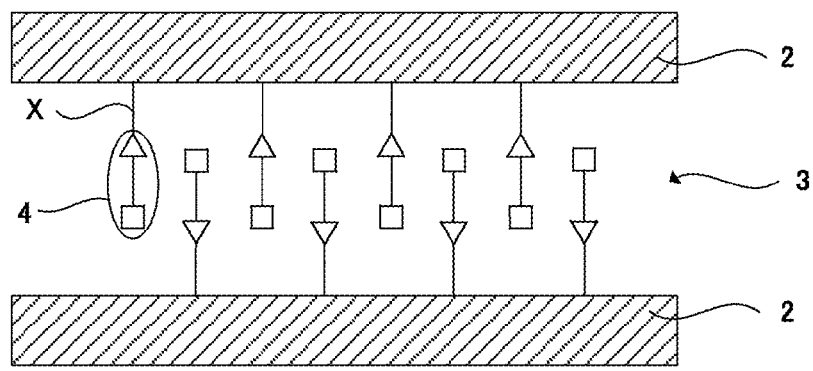
FIG. 2A is an enlarged view of the area shown by IIa in FIG. 1B.

FIG. 2A is an enlarged view of the area shown by IIa in FIG. 1B. As shown in FIG. 2A, the temperature sensitive molecule 4 is chemically bonded (shown by X in FIG. 2A) with the particle skeleton 2 of the mesoporous particle 1 and uniformly retained inside the pore 3.

The temperature-responsive hygroscopic material including the temperature-responsive hygroscopic material particle 10 having such a structure can be produced for example by a method for producing a temperature-responsive hygroscopic material according to the second embodiment of the present disclosure.

2. Method for Producing Temperature-Responsive Hygroscopic Material

The second embodiment of the present disclosure is a method for producing a temperature-responsive hygroscopic material, the method including a step of causing, in a solvent including an activator and a coupling agent, a coupling reaction of: a mesoporous body having an average pore diameter of 2 nm to less than 50 nm and having a functional group on a surface thereof; and a temperature sensitive molecule having a functional group which can undergo a coupling reaction with the functional group on the surface of the mesoporous body.

According to the production method of the present disclosure, it is possible to uniformly retain temperature sensitive molecules inside pores of the mesoporous body.

In the method for producing the composite silica gel described in Non-Patent Literature 1, mesoporous silica is immersed in a mixture solution of monomers of a temperature sensitive polymer and a polymerization initiator, thereafter the temperature sensitive polymer is retained inside a pore of the mesoporous body by thermal polymerization. With this method, it is difficult to further introduce monomers and polymerization agent into the pore after the monomers introduced in the pore earlier are polymerized, due to steric hindrance of generally bulky temperature sensitive polymers. Thus, it can be considered that the composite silica gel described in Non-Patent Literature 1 is small in hygroscopic property according to temperature variation, since temperature sensitive polymers are not uniformly retained in pores of the mesoporous silica gel and the retaining amount of the temperature sensitive polymers is insufficient.

In contrast, with the production method of the present disclosure, by preliminarily polymerizing monomers of a temperature sensitive molecule to produce the temperature sensitive molecule, and chemically bonding a functional group of the temperature sensitive molecule and a functional group on the surface of a mesoporous body having a predetermined average pore diameter, it is possible to uniformly retain more temperature sensitive molecules in pores of the mesoporous body than before. Therefore, it is possible to have a large variation in hygroscopic property according to temperature variation. The temperature-responsive hygroscopic material having such a property can absorb and release moisture (regenerate) in wider ranges of temperature and relative humidity than those of conventional materials. Therefore, it can be employed as a dehumidifying material that is more versatile than conventional materials.

Figure 3:
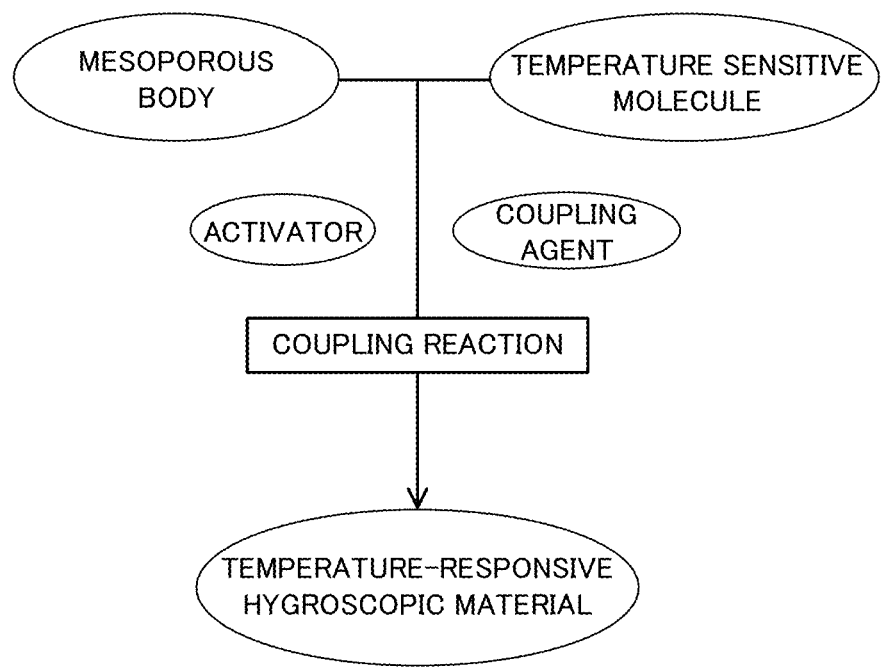
FIG. 3 is a view schematically showing one embodiment of the production method of the present disclosure.

FIG. 3 is a view schematically showing one embodiment of the production method of the present disclosure. In the production method shown in FIG. 3, a mesoporous body and a temperature sensitive molecule are used as raw materials. A temperature-responsive hygroscopic material is produced by coupling reaction of the mesoporous body and the temperature sensitive molecule, under existence of an activator and coupling agent.

Hereinafter, each configuration of the method for producing a temperature-responsive hygroscopic material will be described referring to FIG. 2.

2.1. Mesoporous Body

The mesoporous body used in the production method of the present disclosure is a porous body having pores (meso pores) whose average pore diameter is 2 nm to less than 50 nm. The mesoporous body is not particularly limited, so long as it has such pores. For example, a mesoporous body described in JP H11-114410 A can be used, such as the mesoporous silica described therein. In view of improving the hygroscopic property of the temperature-responsive hygroscopic material produced with the production method of the present disclosure, the average pore diameter of the mesoporous body is preferably 2 nm to 30 nm or less, more preferably 2 nm to less than 10 nm and further preferably 2 nm to 4 nm or less.

Figure 2B:
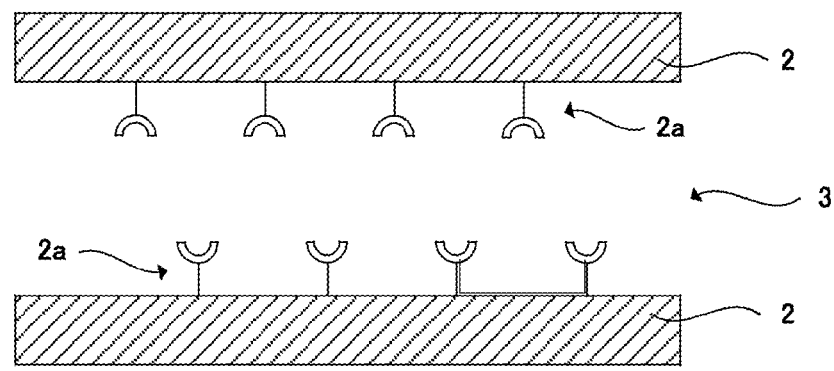
FIG. 2B is a view of a mesoporous particle 1 seen from the same viewpoint as in FIG. 2A.

FIG. 2B is a view of the mesoporous particle 1 in which the temperature sensitive molecule 4 is not chemically bonded, seen from the same viewpoint as in FIG. 2A. As shown in FIG. 2B, the mesoporous particle 1 includes, on the surface of the particle skeleton 2, a plurality of functional groups 2a having a binding property. Each functional group 2a can undergo a coupling reaction with a functional group 4a of the temperature sensitive molecule 4, which is described below. Undergoing a coupling reaction with the functional group 4a of the temperature sensitive molecule 4, the functional group 2a can form a chemical bond X, as shown in FIG. 2A. Therefore, the mesoporous body 1 can strongly retain the temperature sensitive molecule 4. Examples of the functional group having a binding property, which is on the surface of the mesoporous body, includes an amino group, carboxyl group, hydroxyl group, epoxy group, vinyl group, isocyanate group, thiol group, sulfide group, ureido group, acryloxy group and methacryloxy group. Each pore may include a combination of two or more different types of functional group.

2.2. Temperature Sensitive Molecule

The temperature sensitive molecule used in the production method of the present invention has a LCST in water, and shows hydrophilicity at a temperature lower than the LCST and shows hydrophobicity at a temperature higher than the LCST.

The temperature sensitive molecule is not particularly limited as long as the molecule has such a property. In view of easy introduction of temperature sensitive molecules into pores of the mesoporous body having an average pore diameter of 2 nm to less than 50 nm with the method for producing the temperature-responsive hygroscopic material described below, the molecule preferably has a number average molecular weight of 2000 to 5000. Examples of the temperature sensitive molecule include oligomers which include, as constituent units, monomers forming the temperature sensitive polymers described in D. Roy, W. L. A. Brooks and B. S. Sumerlin, Chem. Soc. Rev., 2013, 42, 7214-7243. Specifically, examples include N-isopropylacrylamide (NIPAM) oligomer, N-n-propylacrylamide (NNPAM) oligomer, N-cyclopropylacrylamide (NCPAM) oligomer and N,N-dimethylacrylamide (DEAM) oligomer. These oligomers have a different LCST from each other. Therefore, by employing these different temperature sensitive molecules, it is possible to produce a temperature-responsive hygroscopic material whose hygroscopic property varies according to predetermined temperatures. More than one type of temperature sensitive molecule can be included in temperature-responsive hygroscopic material.

Figure 2C:
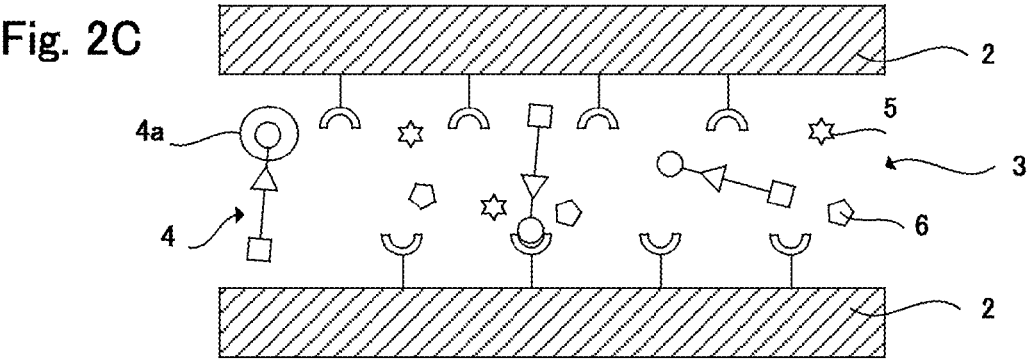
FIG. 2C is a view showing a state in which a temperature sensitive molecule 4, activator 5 and coupling agent 6 are introduced in a pore 3, seen from the same viewpoint as in FIGS. 2A and 2B.

FIG. 2C is a view showing a state in which the temperature sensitive molecule 4, the activator 5 and the coupling agent 6 are introduced in the pore 3, seen from the same viewpoint as in FIGS. 2A and 2B. The method of introducing the temperature sensitive molecule, activator and coupling agent into the pore of the mesoporous body is not particularly limited. For example a method of: dispersing the mesoporous body, temperature sensitive molecule, activator and coupling agent in a suitable solvent; and impregnating the inside of pores of the mesoporous body with the temperature sensitive molecule, activator and coupling agent can be given. At this time, decompression, stirring and the like can be carried out in order to promote introduction of each substance into pores of the mesoporous body.

The temperature sensitive molecule includes a functional group which can undergo a coupling reaction with the functional group on the surface of the mesoporous body. Therefore, the functional group of the temperature sensitive molecule can react with the functional group on the surface of the mesoporous body, to form a chemical bond. Thus, the mesoporous body can strongly retain the temperature sensitive molecule. In an example shown by FIG. 2C, the temperature sensitive molecule 4 has, on one side thereof, a functional group 4a which can undergo a coupling reaction with a functional group 2a on the surface of the mesoporous body. The functional group provided with the temperature sensitive molecule is not particularly limited as long as it can undergo a coupling reaction with the functional group on the surface of the mesoporous body. In a case where the surface of the mesoporous body has an amino group as the functional group, preferable examples of the functional group provided with the temperature sensitive molecule include a carboxyl group, isocyanate group, epoxy group, vinyl group, carbonyl group and hydroxyl group. A vinyl group and hydroxyl group cannot undergo coupling reactions directly. However, they convert to functional groups (e.g. carboxyl group) which can undergo coupling reactions via another reaction, to thereby undergo coupling reactions. As described, the "functional groups which can undergo coupling reactions" include functional groups which undergo coupling reactions indirectly.

The functional group of the temperature sensitive molecule may be a functional group which is preliminarily added and which the temperature sensitive molecule did not originally have. In addition, the functional group, which can undergo a coupling reaction with the functional group on the surface of the mesoporous body, is preferably positioned at an end portion of the temperature sensitive molecule.

As the original structure, some temperature sensitive molecules do not have any functional group which can undergo a coupling reaction with the functional group on the surface of the mesoporous body, or some temperature sensitive molecules have a plurality of functional groups which can undergo coupling reactions. In a case where a temperature sensitive molecule not having a functional group which can undergo a coupling reaction with the functional group on the surface of the mesoporous body is used, it is possible to cause a coupling reaction with the functional group on the surface of the mesoporous body, by preliminarily adding a functional group which can undergo a coupling reaction with the functional group on the surface of the mesoporous body to the temperature sensitive molecule, before causing a coupling reaction. In a case where a temperature sensitive molecule having a plurality of functional groups which can undergo coupling reactions with functional groups on the surface of the mesoporous body is used, it is possible to prevent movement of the temperature sensitive molecule from being obstructed due to coupling reactions of the plurality of functional groups of the temperature sensitive molecule and the functional groups on the surface of the mesoporous body, by preliminarily adding a functional group different from the functional groups which are originally provided with the temperature sensitive molecule, to a desirable position. The method of adding a functional group which is not originally provided with the temperature sensitive molecule to the temperature sensitive molecule is not particularly limited, and a conventional known method can be employed.

With the functional group positioned at an end portion of the temperature sensitive molecule and capable of undergoing a coupling reaction with the functional group on the surface of the mesoporous body, it is possible to fix a sufficient amount of temperature sensitive molecules on the surface of the mesoporous body, without obstructing movement of the temperature sensitive molecules. The "movement of the temperature sensitive molecules" means the movement necessary for temperature responsiveness. It means that the temperature sensitive molecules are in a hydration state with the molecular chain extending at a temperature lower than the LCST, and is in a dehydration state with the molecular chain bunching up at a temperature higher than the LCST.

2.3. Activator

The activator used in the production method of the present disclosure is a reagent that activates the functional group on the surface of the mesoporous body or the functional group of the temperature sensitive molecule upon coupling reaction. The activator promotes a coupling reaction when used with a coupling agent. For example, in a case where the functional group on the surface of the mesoporous body is an amino group and the functional group of the temperature sensitive molecule is a carboxyl group, examples of activators which can be used include activation reagents of carboxylic acid such as N-hydroxysuccinimide (NHS), 1-hydroxybenzotriazole (HOBt), 1-hydroxy-7-azabenzotriazole (HOAt) and pentafluorophenol.

2.4. Coupling Agent

The coupling agent employed in the production method of the present disclosure is a reagent which activates the functional group on the surface of the mesoporous body or the functional group of the temperature sensitive molecule upon coupling reaction. The coupling agent promotes a coupling reaction. For example, in a case where the functional group on the surface of the mesoporous body is an amino group and a functional group provided for the temperature sensitive molecule is a carboxyl group, preferably the coupling agent is a dehydration condensation agent which promotes an elimination-addition reaction. Examples thereof include carbodiimide-based condensation agents such as 1-ethyl-3-(3-dimathylaminopropyl)carbodiimide hydrochloride, N,N'-dicyclohexylcarbodiimide (DCC) and N,N'-diisopropylcarbodiimide (DIC).

2.5. Coupling Reaction

The kind of coupling reaction in the production method of the present disclosure is not particularly limited as long as the functional group on the surface of the mesoporous body and the functional group of the temperature sensitive molecule selectively react with each other to form a chemical bond, under existence of an activator and coupling agent.

Figure 2D:
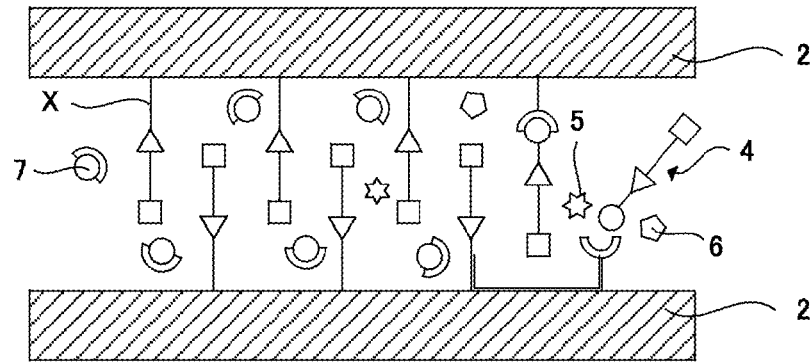
FIG. 2D is a view schematically showing a state in which a coupling reaction partly progresses, seen from the same viewpoint as in FIGS. 2A to 2C.

FIG. 2D is a view schematically showing a state in which a coupling reaction partly progresses, in the same viewpoint as in FIGS. 2A to 2C. The coupling reaction shown in FIG. 2D is an elimination-addition reaction. The functional group 2a on the surface of the particle skeleton 2 of the mesoporous particle 1 and the functional group 4a of the temperature sensitive molecule 4 are coupled at a ratio of 1:1.

In an elimination-addition reaction, intermediates and other various kinds of byproducts can be made in the reaction of: the functional group on the surface of the mesoporous body or the functional group of the temperature sensitive molecule; and the activator or the coupling agent. Here, technically, it is regarded that a leaving group 7 is formed when apart of the functional group 2a on the surface of the particle skeleton 2 of the mesoporous particle 1 and apart of the functional group 4a of the temperature sensitive molecule 4 are bonded. For example, in a case where the functional group 2a is an amino group and the functional group 4a is a carboxyl group, it can be technically regarded that a water molecule is eliminated as the leaving group 7. In this case, an amide bond is formed as the chemical bond X.

Reaction temperature and reaction time in the coupling reaction is adequately determined depending on the kind of coupling reaction and the kinds of activator and coupling agent to be used. For example, when the functional group on the surface of the mesoporous body is an amino group and the functional group of the temperature sensitive molecule is a carboxyl group, a coupling reaction (elimination-addition reaction) can be completed with a reaction time of 24 to 48 hours in a temperature range of 0° C. to 80° C. If the added amount is insufficient, the coupling reaction step can be repeated.

The introduced amount of the temperature sensitive molecule introduced to the mesoporous body is preferably 5.2 mass % to 21.4 mass %, and more preferably 8.4 mass % to 18.9 mass %, based on the total mass of the temperature-responsive hygroscopic material in view of realizing a large variation in hygroscopic property according to temperature variation. The temperature sensitive molecule can be retained on a surface area other than pores of the mesoporous body.

EXAMPLES

Example 1

[Synthesis of Temperature-Responsive Hygroscopic Material]

A temperature-responsive hygroscopic material according to Example 1 was synthesized by means of introduction steps (1) to (8) shown below. The following were used as main raw materials.
(Main Raw Material)
Mesoporous body: spherical aminopropyl silica gel (manufactured by GL Sciences Inc.)
average particle diameter: 10 μm
specific surface area: 412 m²/g
average pore diameter: 10.1 nm
Temperature sensitive molecule: carboxyl termination N-isopropylamide (NIPAM) oligomer (manufactured by Sigma-Aldrich) number average molecular weight: two kinds of 2000 and 5000
(Introduction Steps)
(1) In a 300 ml four neck flask, 4.50 g of mesoporous body, 3.60 g of temperature sensitive molecule, 0.26 g of hydroxysuccinimide (NHS), 0.42 g of 1-ethyl-3-(3-dimethylaminopropyl)carbodiimide hydrochloride (EDC) and 75 ml of dimethylformamide (DNF) were added.
(2) In order to deaerate hole portions of the mesoporous body, the inside of the flask was decompressed while the contents of the flask were stirred with a stir bar for 5 minutes, followed by an argon flow at 50 ml/min for 5 minutes. This operation was repeated five times in total, whereby the hole portions were deaerated.
(3) The contents of the flask were cooled to 0° C. with an argon flow at 50 ml/min, which was maintained for 24 hours.
(4) The reaction liquid thus obtained was added to 525 ml of deionized water. The resulting liquid was put in twelve centrifuge tubes, each having a capacity of 50 ml, and subjected to centrifugation at 15000 rpm for 2 minutes.
(5) Supernatant was removed, and 45 ml of deionized water was added to each of the centrifuge tubes. The contents of the centrifuge tubes were subjected to centrifugation at 15000 rpm for 5 minutes.
(6) Supernatant was removed, and 45 ml of deionized water was added to each of the centrifuge tubes. The contents of the centrifuge tubes were subjected to centrifugation at 15000 rpm for 7 minutes.
(7) Supernatant was removed, and 45 ml of deionized water was added to each of the centrifuge tubes. The contents of the centrifuge tubes were subjected to centrifugation at 15000 rpm for 10 minutes.
(8) The obtained deposition was dried under reduced pressure at 70° C. for 12 hours, whereby a temperature-responsive material powder according to Example 1 was obtained.
[Evaluation Method]
(Introduced Amount of Temperature Sensitive Molecule)

Weights of the mesoporous body before the temperature sensitive molecule was introduced and the temperature-responsive hygroscopic material after the temperature sensitive molecule was introduced were measured. After that, the mesoporous body and temperature-responsive hygroscopic material were separately put in containers made of alumina and covered with a lid, and heated in the atmosphere at 1,000° C. for 24 hours. Thereafter, the weight of residual silica was measured. Then, the introduced amount of the temperature sensitive molecule was calculated by: measuring the weight reduction ratio of the mesoporous body and the temperature-responsive hygroscopic material from their weights before and after heating; and subtracting the weight reduction ratio of the mesoporous body from the weight reduction ratio of the temperature-responsive hygroscopic material. The result is shown in Table 1.
(Isothermal Line of Water Vapor Adsorption)

Figure 4:
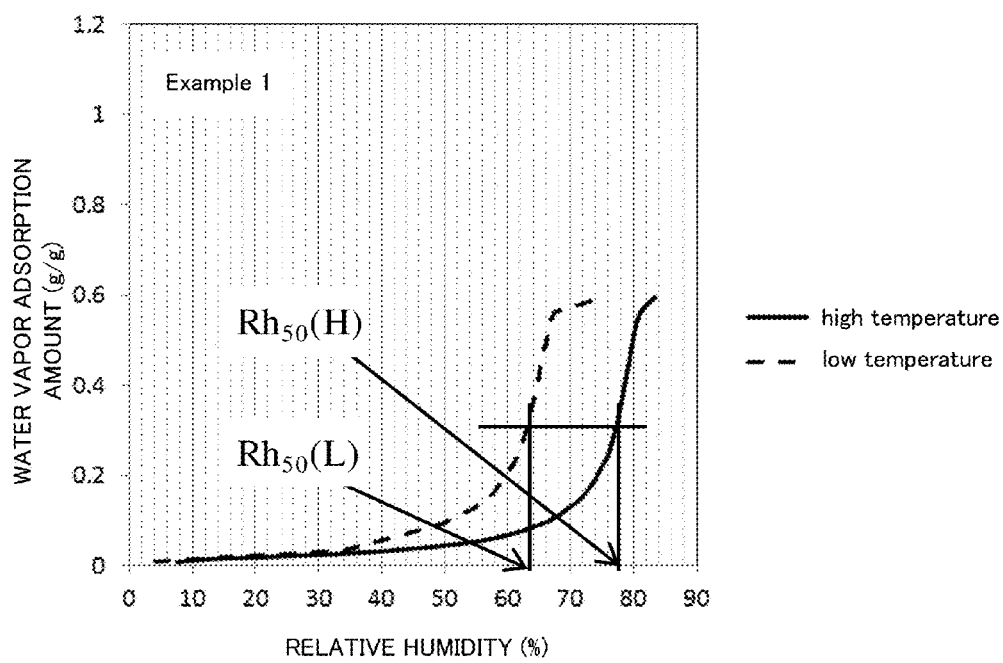
FIG. 4 is a view showing measurement results of isothermal lines of water vapor adsorption of Example 1.

Isothermal lines of water vapor adsorption of poly(N-isopropylacrylamide) (PNIPAM) at temperatures lower (20° C.) and higher (50° C.) than the LCST (32° C.) were measured by means of BELSORP-max (manufactured by BEL Japan Inc.). The results are shown in FIG. 4.

Figure 12:
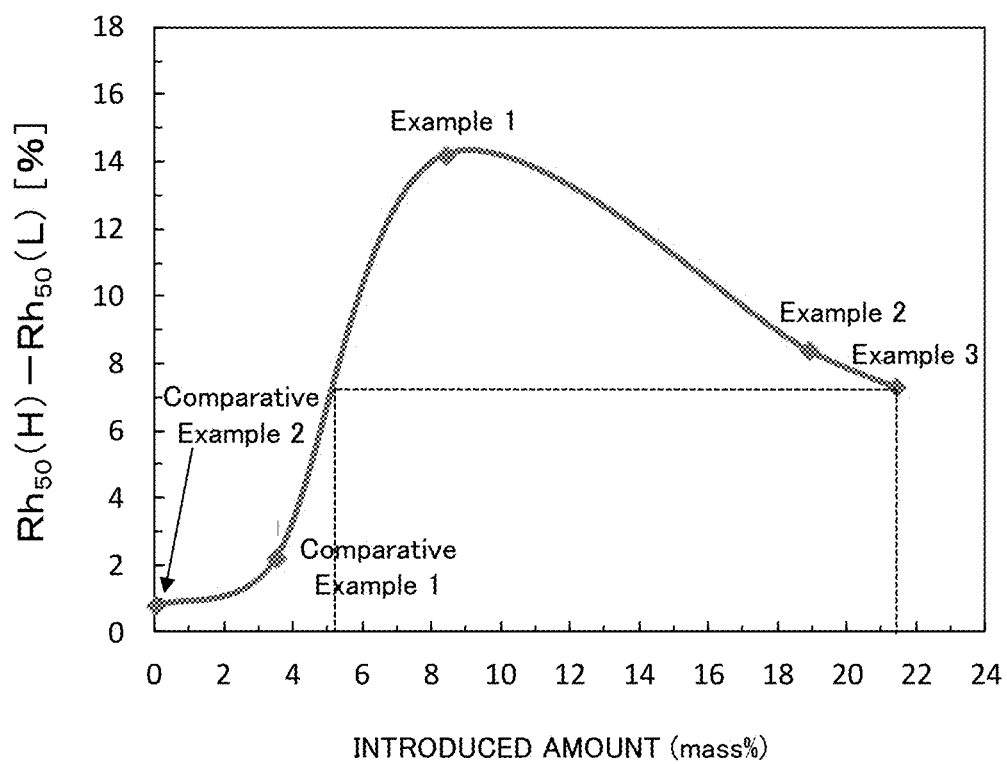
FIG. 12 is a graph in which variation amount ($Rh_{50}(H)$–$Rh_{50}(L)$) of relative humidity $Rh_{50}$ according to temperature when each of the temperature-responsive hygroscopic materials according to Examples 1 to 3 and Comparative Examples 1 and 2 adsorbs moisture in an amount of 50% of the maximum adsorption amount is plotted with respect to the introduced amount of the temperature sensitive molecule.

Further, the relative humidity $Rh_{50}$ ($Rh_{50}$ (L) means $Rh_{50}$ at 20° C., $Rh_{50}$(H) means $Rh_{50}$ at 50° C.) at which the temperature-responsive hygroscopic material adsorbs 50% of the maximum adsorption amount at each temperature was measured to obtain temperature variation at $Rh_{50}$ ($Rh_{50}$(H)−$Rh_{50}$(L)). $Rh_{50}$ (L) and $Rh_{50}$ (H) are shown in FIG. 4, and measurement result is shown in Table 2. FIG. 12 is a view in which $Rh_{50}$(H)−$Rh_{50}$(L) is plotted with respect to the introduced amount of the temperature sensitive molecule.

Example 2

[Synthesis of Temperature-Responsive Hygroscopic Material]

A temperature-responsive hygroscopic material according to Example 2 was synthesized in the same way as in Example 1, except that: the following step (3)' was carried out instead of the introduction step (3) in Example 1; the powder obtained in the introduction step (8) was collected; and the steps (1) to (8) were repeated twice.
(3)' The contents of the flask were heated to 60° C. with an argon flow at 50 ml/min, which was maintained for 24 hours, and thereafter naturally cooled.
[Evaluation Method]
(Introduced Amount of Temperature Sensitive Molecule)

The introduced amount of the temperature sensitive molecule was calculated in the same way as in Example 1. The result is shown in Table 1.
(Isothermal Line of Water Vapor Adsorption)

Figure 5:
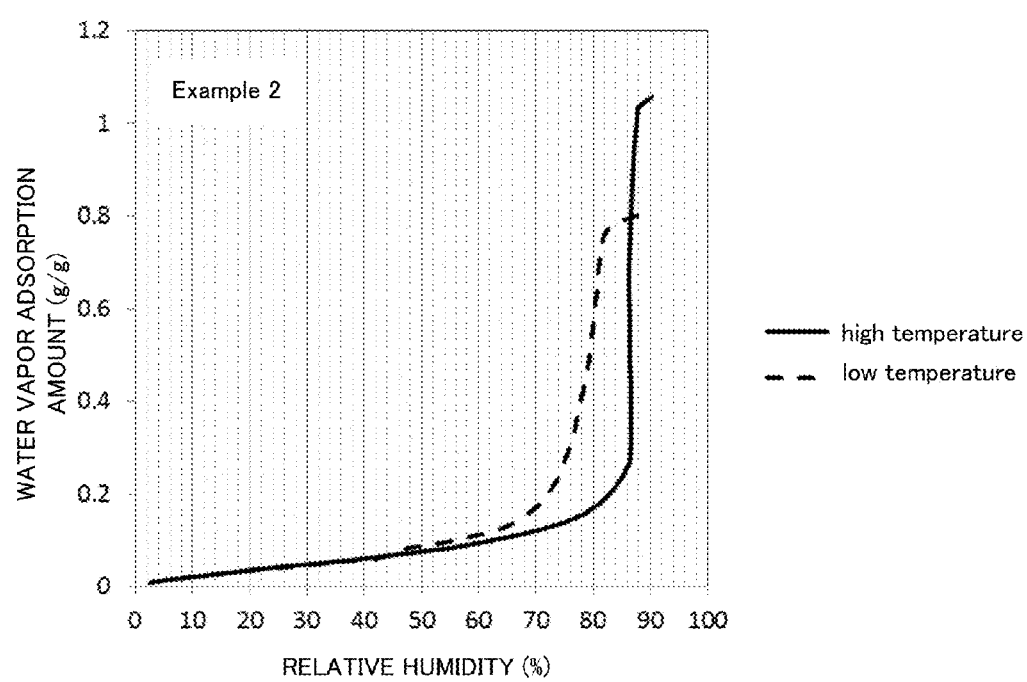
FIG. 5 is a view showing measurement results of isothermal lines of water vapor adsorption of Example 2.

Isothermal line of water vapor adsorption and $Rh_{50}$ were measured in the same way as in Example 1. The results are shown in FIGS. 5 and 12 and Table 2.
(Distribution of Temperature Sensitive Molecule in Mesoporous Body)

Figure 9:
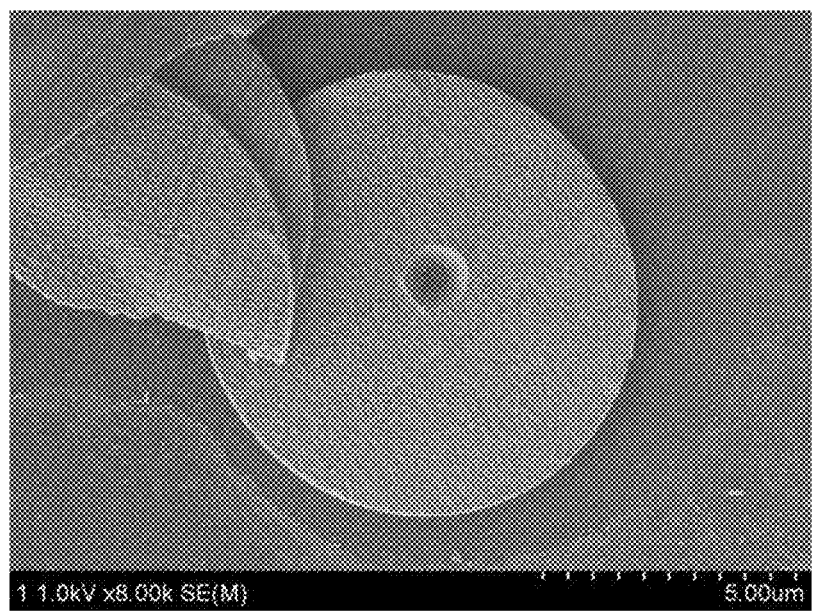
FIG. 9 is a SEM image of a cut surface of a primary particle of a temperature-responsive hygroscopic material according to Example 2.

A primary particle of the temperature-responsive hygroscopic material produced in the manner described above in Example 2 was frozen and thereafter cut with a microtome (Cryo-Microtome, manufactured by Leica Microsystems). A cross section of the particle was observed by means of an SEM (scanning electron microscope). The observed SEM image is shown in FIG. 9. In FIG. 9, the hole at the center was made by ion milling processing and does not reflect tissue of sample.

Figure 10C:
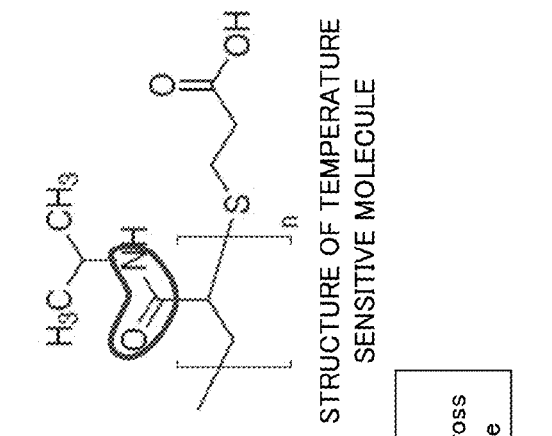
FIG. 10C is a view showing the position of $^{42}$CNO structure in the temperature sensitive molecule used in Examples.
Figure 10B:
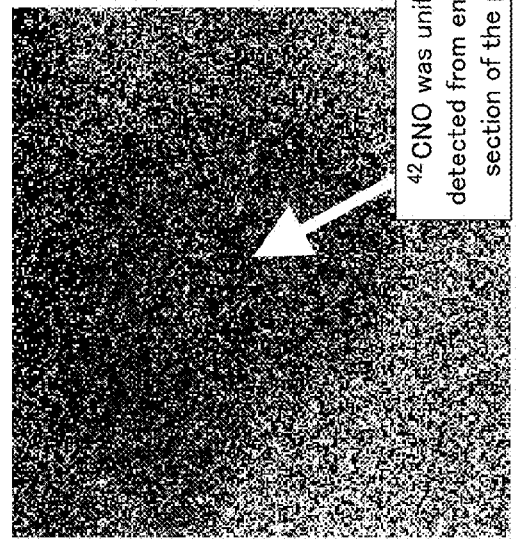
FIG. 10B is a TOF-SIMS image of $^{42}$CNO ions at the cut surface.
Figure 10A:
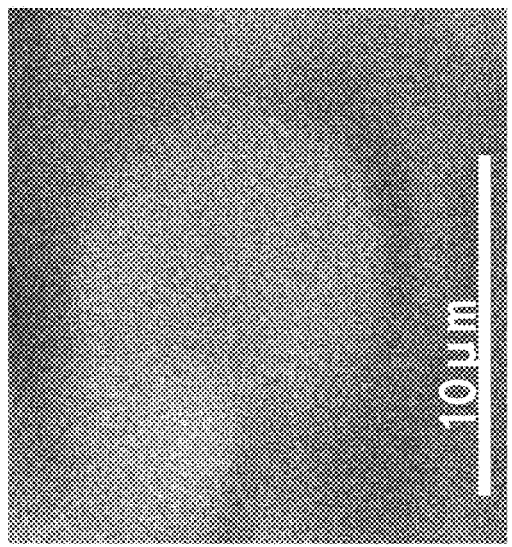
FIG. 10A is a TOF-SIMS image of all ion species at a cut surface of the primary particle of the temperature-responsive hygroscopic material according to Example 2.

Thereafter, the amount of H—C═O bond existing on the cross section was measured by mapping measurement at approximately 1 μm of spacial resolution, by means of TOF-SIMS (TRIFT V nanoTOF, manufactured by ULVAC-PHI, Inc.). Whereby, whether or not the temperature sensitive molecule introduced from the surface of spherical aminopropyl silica reached the center of the sphere was evaluated. FIG. 10A shows a mapping image of a sum of secondary ion intensities of $^{12}C$, $^{13}CH$, $^{16}O$, $^{17}OH$, $^{24}C_2$, $^{25}C_2H$, $^{26}CN$, $^{42}CNO$ and $^{80}SO_3$ which were detected relatively strongly by TOF-SIMS. FIG. 10B shows an image of secondary ion of $^{42}CNO$ which is a unique (not existing in the mesoporous body skeleton or aminopropyl group on the surface) structure to the temperature sensitive molecule. FIG. 10C shows the position of the $^{42}CNO$ structure of the temperature sensitive molecule used in Examples.

Figure 11B:
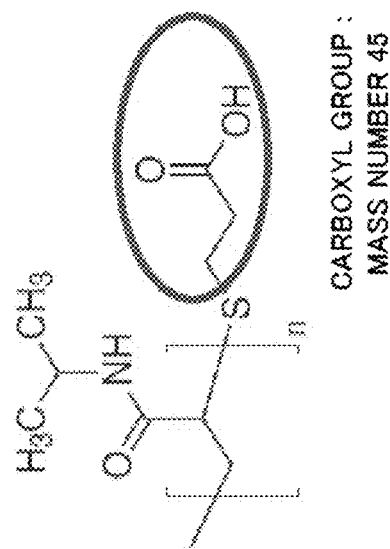
FIG. 11B is a view showing the position of a carboxyl group in the temperature sensitive molecule.
Figure 11A:
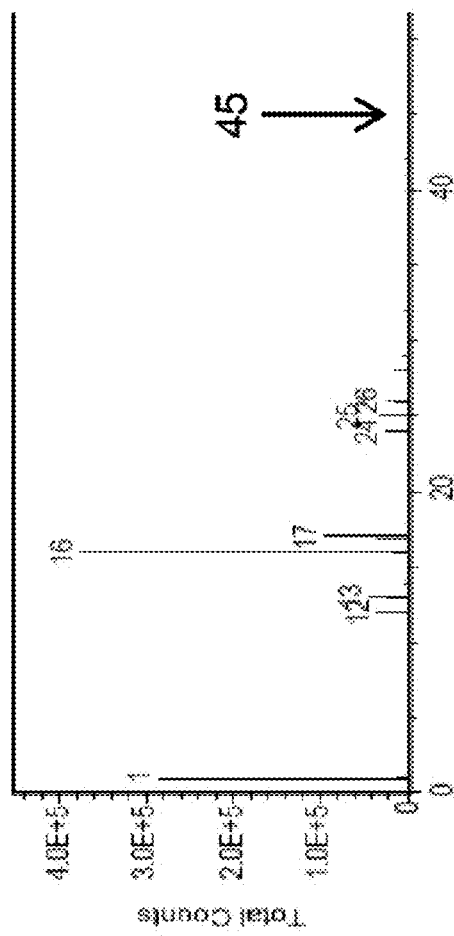
FIG. 11A is a TOF-SIMS spectrum at the cut surface of the primary particle of the temperature-responsive hygroscopic material according to Example 2.

Further, in order to confirm whether or not an unreacted temperature sensitive molecule exists, the peak (mass number 45) corresponding to carboxyl group was examined. FIG. 11A shows TOF-SIMS spectrum. FIG. 11B shows the position of the carboxyl group of the temperature sensitive molecule.

Example 3

[Synthesis of Temperature-Responsive Hygroscopic Material]

A temperature-responsive hygroscopic material according to Example 3 was produced in the same way as in Example 1, except that: the following (3)″ was carried out instead of the introduction step (3); the powder obtained in the introduction step (8) was collected; and the steps (1) to (8) were repeated twice.
(3)″ The contents of the flask were heated to 60° C. with an argon flow at 50 ml/min, which was maintained for 48 hours, and thereafter naturally cooled.
[Evaluation Method]
(Introduced Amount of Temperature Sensitive Molecule)

The introduced amount of the temperature sensitive molecule was calculated in the same way as in Example 1. The result is shown in Table 1.
(Isothermal Line of Water Vapor Adsorption)

Figure 6:
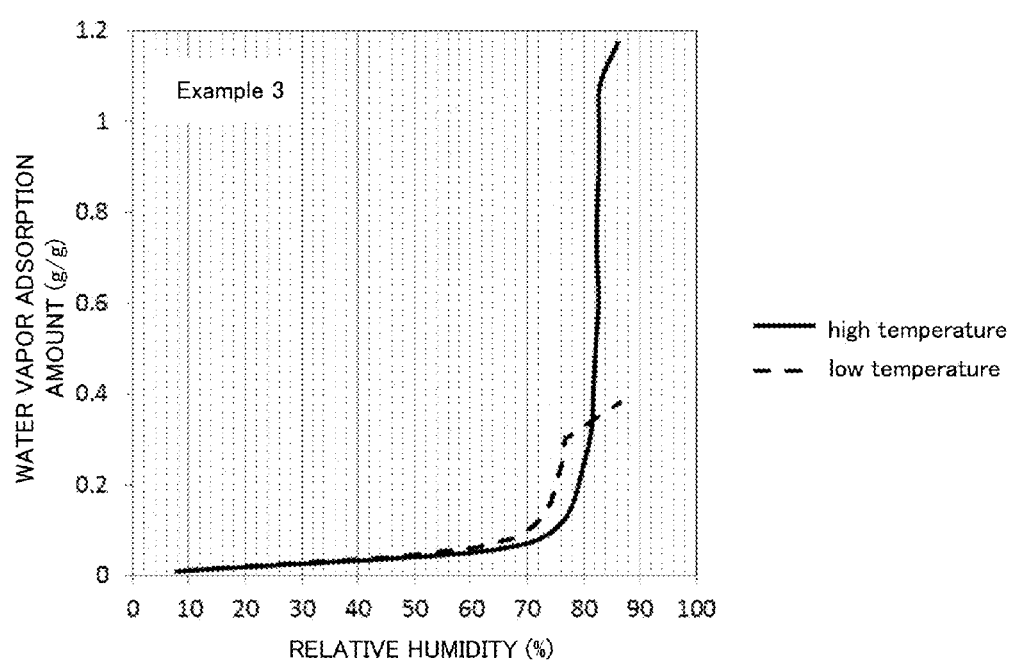
FIG. 6 is a view showing measurement results of isothermal lines of water vapor adsorption of Example 3.

Isothermal line of water vapor adsorption and $Rh_{50}$ were measured in the same way as in Example 1. The results are shown in FIGS. 6 and 12 and Table 2.

Comparative Example 1

A temperature-responsive hygroscopic material according to Comparative Example 1 was synthesized by the following introduction steps (1) to (9), which are conventional techniques. The mesoporous body used in Example 1 was used as a main raw material.
(Introduction Steps)
(1) In a 100 ml recovery flask, 7.00 g (2 mol/l) of N-isopropylamide monomer (NIPAM), 24.41 g of ethanol and 0.01 g (2 mmol/l) of azobisisobuthyronitril (AIBN) were added, and subjected to argon bubbling at 100 ml/min for 15 minutes while being stirred with a stir bar.
(2) To the recovery flask of step (1), 7.00 g of mesoporous body was added. The content of the flask was further subjected to argon bubbling at 100 ml/min.
(3) A three-way cock was attached to the recovery flask. In order to deaerate hole portions of silica, the inside of the flask was decompressed for 5 minutes, and thereafter subjected to an argon flow at 50 ml/min for 5 minutes. This operation was repeated three times in total, whereby deaeration was carried out.
(4) The recovery flask was sealed being filled with argon. Then, polymerization was carried out at 70° C. for 12 hours.
(5) After polymerization, the heat source was removed and the content of the flask was cooled to room temperature.
(6) The reaction liquid thus obtained was put in a 50 ml centrifuge tube and subjected to centrifugation at 15000 rpm for 10 minutes.
(7) Supernatant was removed and deposited silica was redispersed in 540 ml of deionized water. The resulting material was divided in twelve 50 ml centrifuge tubes and subjected to centrifugation at 15000 rpm for 10 minutes.
(8) The cleaning operation of (7) was repeated four times in total.
(9) The obtained deposition was dried under reduced pressure at 70° C. for 12 hours.

When NIPAM and AIBN were polymerized in ethanol at the same concentration, and temperature for the same retention time as in (1), the average molecular weight was Mn=9,892.
[Evaluation Method]
(Introduced Amount of Temperature Sensitive Molecule)

The introduced amount of the temperature sensitive molecule was calculated in the same way as in Example 1. The result is shown in Table 1.
(Isothermal Line of Water Vapor Adsorption)

Figure 7:
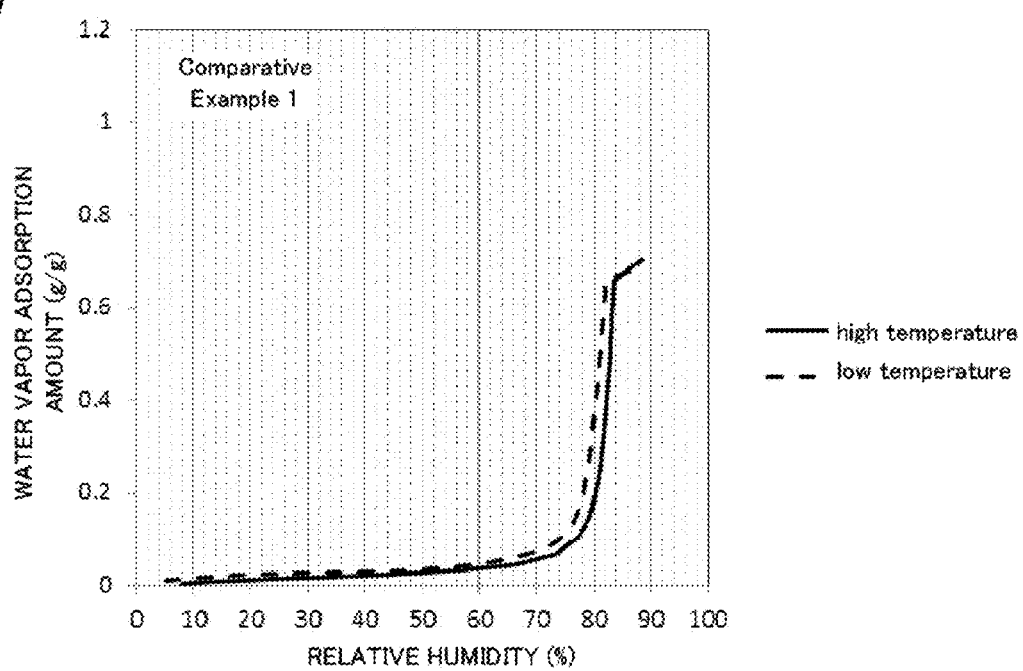
FIG. 7 is a view showing measurement results of isothermal lines of water vapor adsorption of Comparative Example 1.

The isothermal line of water vapor adsorption and $Rh_{50}$ were measured in the same way as in Example 1. The results are shown in FIGS. 7 and 12 and Table 2.

Comparative Example 2

The mesoporous body used in the Examples, but with no temperature sensitive molecule introduced, was used to carry out the following evaluation.
[Evaluation Method]
(Isothermal Line of Water Vapor Adsorption)

Figure 8:
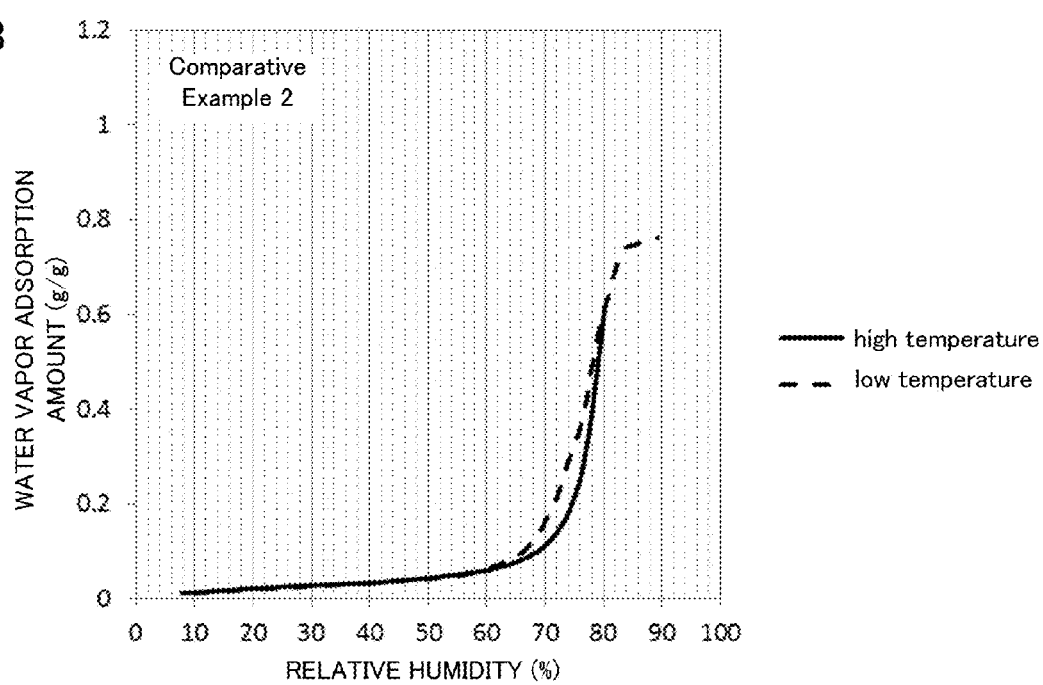
FIG. 8 is a view showing measurement results of isothermal lines of water vapor adsorption of Comparative Example 2.

The isothermal line of water vapor adsorption and $Rh_{50}$ were measured in the same way as in Example 1. The results are shown in FIGS. 8 and 12 and Table 2.

TABLE 1

|  | number average molecular weight | introduced amount (mass %) |
|---|---|---|
| Example 1 | 2,000 | 8.4 |
| Example 2 | 2,000 | 18.9 |
| Example 3 | 5,000 | 21.4 |
| Comparative Example 1 | approx. 10,000 | 3.5 |

TABLE 2

|  | number average molecular weight | $Rh_{50}(L)$ [%] | $Rh_{50}(H)$ [%] | $Rh_{50}(H) - Rh_{50}(L)$ [%] |
|---|---|---|---|---|
| Example 1 | 2,000 | 63.1 | 77.3 | 14.2 |
| Example 2 | 2,000 | 78 | 86.4 | 8.4 |
| Example 3 | 5,000 | 75 | 82.3 | 7.3 |
| Comparative Example 1 | approx. 10,000 | 79.9 | 82.1 | 2.2 |
| Comparative Example 2 | — | 76.3 | 77.1 | 0.8 |

[Result]
(Introduced Amount of Temperature Sensitive Molecule)

From Table 1, it was confirmed that each of the temperature-responsive hygroscopic materials according to Examples 1 to 3 synthesized by an embodiment of the production method of the present disclosure had more temperature sensitive molecules fixed to the mesoporous body than that of the temperature-responsive hygroscopic material according to Comparative Example 1 synthesized by the conventional technique.

(Isothermal Line of Water Vapor Adsorption)

From FIGS. 4 to 8 and 12 and Table 2, it was confirmed that each of the temperature-responsive hygroscopic materials according to Examples 1 to 3 synthesized by an embodiment of the production method of the present disclosure had a larger variation in hygroscopic property according to temperature variation as compared to that of the temperature-responsive hygroscopic material according to Comparative Example 1 synthesized by the conventional technique and as compared to that of the mesoporous body according to Comparative Example 2 not having the temperature sensitive molecule. As for the difference in relative humidity $Rh_{50}$ according to temperature variation, Example 1, which was the most effective example from among Examples 1-3, showed a difference of 14.2%. Example 3, which was the least effective example from among Examples 1 to 3, showed more than twice the difference value of Comparative Example 1. Further, the curve shown in FIG. 12 shows that the difference in relative humidity $Rh_{50}$ according to temperature variation has a value of 7.3%, which is the result of Example 3, or more, with the introduced amount of the temperature sensitive molecule in a range of 5.2 mass % to 21.4 mass % based on the total mass of the temperature-responsive hygroscopic material. It can be said that the hygroscopic property according to temperature variation has a variation large enough for practical use, with such a range of difference in relative humidity $Rh_{50}$ according to temperature variation.

(Distribution of Temperature Sensitive Molecule in Mesoporous Body)

From FIGS. 10A and 10B, it was confirmed that the temperature sensitive molecule was uniformly introduced into the mesoporous body in Example 2. This is because the temperature sensitive molecule was detected even at the center of the primary particle of the temperature-responsive hygroscopic material (mesoporous body), and because the detection intensity was nearly uniform over the entire cross section. Further, it can be considered that the temperature sensitive molecule is strongly bonded with the mesoporous body. This is because the temperature sensitive molecule is distributed over the entire mesoporous body even though cleaning was repeatedly carried out several times in the step of synthesis.

In addition, in the TOF-SIMS spectrum shown in FIG. 11A, the peak (mass number 45) corresponding to a carboxyl group was not detected. This confirmed that the temperature sensitive molecule introduced in a pore of the mesoporous body was bonded with the surface of the mesoporous body via an amide group.

DESCRIPTION OF REFERENCE NUMERALS 1 mesoporous particle
2 particle skeleton
  2a functional group
3 pore
4 temperature sensitive molecule
  4a functional group
5 activator
6 coupling agent
7 leaving group
10 temperature-responsive hygroscopic material particle

The invention claimed is:

1. A temperature-responsive hygroscopic material comprising:
   a mesoporous body having an average pore diameter of 2 nm to less than 50 nm; and
   a temperature sensitive molecule chemically bonded with the mesoporous body inside a pore of the mesoporous body,
   wherein the temperature sensitive molecule has a number average molecular weight of 2000 to 5000, and
   the temperature sensitive molecule is an oligomer selected from the group consisting of N-isopropylacrylamide (NIPAM) oligomer, N-n-propylacrylamide (NCPAM) oligomer, N-cyclopropylacrylamide (NCPAM) oligomer and N,N-dimethylacrylamide (DEAM) oligomer.

2. The temperature-responsive hygroscopic material according to claim 1, wherein an introduced amount of the temperature sensitive molecule is 5.2 mass % to 21.4 mass % based on a total mass of the temperature-responsive hygroscopic material.

3. A method for producing a temperature-responsive hygroscopic material according to claim 1, comprising:
   causing, in a solvent comprising an activator and a coupling agent, a coupling reaction between a mesoporous body having an average pore diameter of 2 nm to less than 50 nm and having a functional group on a surface inside the pore; and a temperature sensitive molecule having a functional group which can undergo a coupling reaction with the functional group on the surface of the mesoporous body,
   wherein the temperature sensitive molecule has a number average molecular weight of 2000 to 5000.

4. The method for producing a temperature-responsive hygroscopic material according to claim 3, wherein the functional group of the temperature sensitive molecule which can undergo a coupling reaction with the functional group on the surface of the mesoporous body is a functional group which the temperature sensitive molecule does not originally have and is preliminarily added to the temperature sensitive molecule.

5. The method for producing a temperature-responsive hygroscopic material according to claim 3, wherein the functional group which can undergo a coupling reaction with the functional group on the surface of the mesoporous body is positioned at an end portion of the temperature sensitive molecule.

6. The method for producing a temperature-responsive hygroscopic material according to claim 4, wherein the functional group which can undergo a coupling reaction with the functional group on the surface of the mesoporous body is positioned at an end portion of the temperature sensitive molecule.

7. The temperature-responsive hygroscopic material according to claim 1, wherein a plurality of temperature sensitive molecules are chemically bonded inside the pore of the mesoporous body.

8. The temperature-responsive hygroscopic material according to claim 7, wherein the plurality of temperature sensitive molecules are uniformly introduced along an axial direction of the pore of the mesoporous body.

9. The temperature-responsive hygroscopic material according to claim 1, wherein the mesoporous body has an average pore diameter of 2 to 30 nm.

10. The method for producing a temperature-responsive hygroscopic material according to claim 3, wherein the activator is selected from the group consisting of N-hydroxysuccinimide (NHS), 1-hydroxybenzotriazole (HOBt), 1-hydroxy-7-azabenzotriazole (HOAt) and pentafluorophenol.

11. The method for producing a temperature-responsive hygroscopic material according to claim 3, wherein the coupling agent is selected from the group consisting of 1-ethyl-3-(3-dimathylaminopropyl)carbodiimide hydrochloride, N,N'-dicyclohexylcarbodiimide (DCC) and N,N'-diisopropylcarbodiimide (DIC).

12. The method for producing a temperature-responsive hygroscopic material according to claim 3, wherein the functional group on a surface inside the pore of the mesoporous body is selected from the group consisting of amino group, carboxyl group, hydroxyl group, epoxy group, vinyl group, isocyanate group, thiol group, sulfide group, ureido group, acryloxy group and methacryloxy group.

13. The method for producing a temperature-responsive hygroscopic material according to claim 3, wherein the functional group of the temperature sensitive molecule is selected from the group consisting of carboxyl group, isocyanate group, epoxy group, vinyl group, carbonyl group and hydroxyl group.

14. The method for producing a temperature-responsive hygroscopic material according to claim 3, wherein the mesoporous body has an average pore diameter of 2 to 30 nm.

* * * * *